United States Patent [19]
Klinger et al.

[11] Patent Number: 5,298,291
[45] Date of Patent: Mar. 29, 1994

[54] EPOXY-FUNCTIONAL FLUOROPOLYOL POLYACRYLATE COATING OF OPTICAL FIBERS

[75] Inventors: Liliana Klinger, Jackson, N.J.; James R. Griffith, Riverdale Heights, Md.

[73] Assignee: The United States of America as represented by the Secretary of the Navy, Washington, D.C.

[21] Appl. No.: 34,843

[22] Filed: Mar. 19, 1993

Related U.S. Application Data

[60] Division of Ser. No. 530,509, May 31, 1990, abandoned, which is a continuation of Ser. No. 273,444, Nov. 18, 1988, abandoned.

[51] Int. Cl.$^5$ .................. B05D 3/06; B05D 5/06; C08L 33/14
[52] U.S. Cl. .................. 427/513; 427/163; 427/519; 522/46; 522/120; 522/121; 525/257; 525/276; 525/903; 525/532
[58] Field of Search .............. 525/530, 531, 257, 276, 525/903, 532; 427/163, 513, 519; 522/46, 120, 121

[56] References Cited

U.S. PATENT DOCUMENTS

| | | | |
|---|---|---|---|
| 3,879,430 | 4/1975 | O'Rear et al. | 549/559 |
| 4,157,358 | 6/1979 | Field et al. | 525/187 |
| 4,284,747 | 8/1981 | Griffith et al. | 525/530 |
| 4,367,918 | 1/1983 | Pinnow | 65/3.12 |
| 4,511,209 | 4/1985 | Skutnik | 522/172 |
| 4,530,569 | 7/1985 | Squire | 280/22 |
| 4,647,149 | 3/1987 | McCartney | 385/77 |
| 4,711,522 | 12/1987 | McCartney | 385/88 |
| 4,914,171 | 4/1990 | Zweig | 526/246 |
| 5,022,737 | 6/1991 | Yamamoto et al. | 522/182 |

OTHER PUBLICATIONS

Fluoropolymer Barriers to Stress Corrosion in Optical Fibers—Klinger, Griffith—*J. Mater. Res.* vol. 2, No. 6, Nov./Dec. 1987.
Epoxy Resins Containing Fluorine—Griffith, Chemtech—May 1982.

*Primary Examiner*—Robert E. Sellers
*Attorney, Agent, or Firm*—Thomas E. McDonnell; Barry A. Edelberg

[57] ABSTRACT

An infinite network polymer containing fluorine as a coating or cladding material for optical fibers. Fluoropolymers, such as silicone amine $C_0$–$C_{16}$ fluoroepoxy resin and cis-trans fluoropolyol polyacrylate, reduce water permeability because of the bonding between the fluoropolymer and the substrate. The fluoropolymers exhibit substantially increased moisture resistance when compared to conventional fiber coating materials. Variations in chemical structure effect physical properties of the polymer and different compounds can be chosen for their desired physical properties, such as moisture resistance or abrasion resistance. Incorporation of fluorine into the polymer structure lowers the index of refraction such that the polymer can be used as a cladding for silica glass in an optical fiber. One fluoropolymer formulation allows in-line coating of the optical fiber in a oxygen environment.

6 Claims, 4 Drawing Sheets or

R$_F^*$ is (CF$_2$)$_7$CF$_3$ AND

AT LEAST ONE X is

WHERE X is z1 and z2 are integers from one to three and b is an interger of which the average is in the range from one to fifteen, or X is $R_F^*$ is H or $(CF_2)_nCF_3$,
n is from zero to fifteen, and
at least one X must be n is an integer from 4 to 10 and
R_F is

EPOXY-FUNCTIONAL FLUOROPOLYOL POLYACRYLATE COATING OF OPTICAL FIBERS

This application is a divisional application of U.S. patent application Ser. No. 07/530,509, filed May 31, 1990, now abandoned, which is a continuation application of U.S. patent application Ser. No. 07/273,444, filed Nov. 18, 1988, now abandoned.

BACKGROUND OF THE INVENTION

1. Field of the Invention

This invention relates to infinite network polymers for coating and cladding optical fibers, specifically, to infinite network polymers containing fluorine for coating and cladding optical fiber.

2. Description of the Prior Art

Organic polymer coatings on optical fibers improve protection of the silica glass surface from abrasive damage and environmental effects, such as corrosion due to stress and moisture permeation. In addition, they act as a buffer in reducing the sensitivity of the optical fiber to microbending loss.

Small external forces due to an irregular surface of the optical fiber are sufficient to cause lateral deformation, mode coupling and optical loss. Polymer coatings can be designed to reduce static fatigue and microbending loss. The elastic or relaxation modulus of the polymer is a good indicator of how effective the coating is in protecting the clad fiber from these effects. It has been observed that coatings with relaxation modulus values less than $10^8$ dyn/cm$^2$ are effective in reducing microbending loss.

Stress-induced corrosion by water is associated with stress concentrations at surface flaws under tensile deformation. The only ways to protect the glass fiber against stress corrosion are to limit the applied stress that it experiences or to prevent the buildup of water and hydroxyl ions at the fiber surface. Moisture may permeate through a polymer coating while it is being stored under tension, as found in material wound on drums, or during deployment on hydrous terrain.

Determining the chemical and physical effects of moisture vapor permeability on the optical fiber requires balancing several conflicting factors, such as effects of polar groups, fluorinated substituents, symmetry and segmental mobility. Polar groups that improve adhesion to glass and prevent buildup of water at the interface also increase moisture vapor permeability. This is due to the strong localized interaction between the small polar water molecule and polar groups within the polymer. Both low moisture vapor permeability and good adhesion are important factors in preventing stress corrosion of the optical fiber.

The process of permeation of water through a polymer film involves wetting of the polymer surface, sorption of water into the polymer matrix, diffusion through the film along a concentration gradient and desorption of water from the polymer surface. Incorporation of fluorine into the polymer chain reduces surface wettability and sorption of water. Halogenated polymers have the lowest moisture vapor permeabilities of all polymers.

Coating optical fibers in-line with a polymer resin requires resolution of certain problems that may arise in the formulation of the resin and in the direct coating of the resin onto the glass fiber. Problems which may arise in formulation of the resin are lumps, high viscosity and low polymerization rate. To avoid these problems, 1) the initiator must be thoroughly dissolved into the resin in such a manner to avoid lumps,
2) the viscosity of the resin must be adjusted to within a desirable range
3) an optimum amount of photoinitiator must be employed since too high a photoinitiator concentration can cause a lower polymerization rate because of the generation of an uneven distribution of free radicals and
4) precautions must be taken to prevent oxygen inhibition.

Application of the coating in-line with the drawing of the glass fiber requires low viscosities ($10^3$–$10^4$ centipoises), rapid solidification and fast cross-linking reactions. Ultraviolet (UV) cures are preferable but rapid thermal cures are possible.

Problems that may arise during in-line coating and curing of the optical fiber include poor wetting of the substrate, rapid shrinkage of the resin resulting in the creation of internal stresses in the coating material and incomplete overall film curing as evidenced by a tacky surface. To avoid these problems, 1) the critical surface energy of the solid glass core ($\gamma_s$) must be greater than the critical surface energy of the liquid prepolymer resin ($\gamma_l$) for a smooth and continuous coating,
2) film thickness must be properly adjusted because too thin a coating results in reduced scratch and solvent resistance, whereas a coating that is too thick will result in an undercure at the coating/substrate interface.

Hermetic coatings have been developed which require chemical vapor deposition. These hermetic coatings of silicone oxynitride, silicon carbide and titanium carbide do not allow any moisture to permeate and thus provide protection against stress corrosion and resist to attack by acid and alkali. However, the application of a hermetic coating results in a loss in dynamic fatigue strength as compared to the strength of an uncoated fiber.

A polymer coating having a low index of refraction (less than that of the silica glass core, $n_r = 1.458$, or other optical fiber) may be used as a cladding. As taught in U.S. Pat. No. 4,511,209, a fluoropolymer coating/cladding system has been developed by Ensign-Bickford utilizing aliphatic fluoropolymers, which are linear polymers. These fluoropolymer coatings have a water permeability and water vapor transmission rate of about an order of magnitude better than comparable commercial polymer coatings. The coating are not hermetic but protect against static fatigue and adhere to the glass surface.

Infinite network polymers have some advantages over linear polymers in that they are stronger as defined by tensile modulus, have no melting points but thermally decompose, have little or no solubility in solvents, have less defined glass transition temperatures and as thermosetting, not thermoplastic, polymers are capable of a UV cure. It is believed that there has been no reported use of an infinite network polymer containing fluorine used as a coating or cladding for an optical fiber.

SUMMARY OF THE INVENTION

It is an object of this invention to reduce water permeability relative to commercially available ultraviolet curable acrylate coatings by an order of magnitude.

Also, it is an object of this invention to have an index of refraction of the polymer structure such that the invention is usable as a cladding in conjunction with silica glass.

Additionally, it is an object of this invention to be used as a coating for optical fiber which can be processed in-line in an oxygen environment.

Further, it is an object of this invention to be cured with a fast cure process using ultraviolet radiation.

These and other objects are achieved by use of infinite. network fluoropolymers as coating materials on glass fiber. Specific examples of infinite network fluoropolymers which can be used as coating or claldding material on glass fiber are silicone amine $C_0$–$C_{16}$ fluoroepoxy resin and cis-trans fluoropolyol polyacrylate.

DETAILED DESCRIPTION OF THE INVENTION

This invention is an infinite network polymer containing fluorine which can serve as a coating or cladding material for optical fibers. The optical fiber can be of any material used as a light guide, such as fused silica, or any transparent plastic suitable for transmitting light. The most preferred material is silica glass.

The fluoropolymer can be coated by any known means for coating optical fibers. The most preferred method is an optical fiber draw tower with in-line coating of the coating or cladding material.

The fluoropolymers can be cured by any known means for curing thermosetting polymers, such as heat or radiation. The preferred method is radiation, either ultraviolet or gamma. The most preferred method is UV light initiation of free-radical polymerization, which is fast and is carried out in air without the use of a nitrogen blanket, vacuum system or other isolation technique.

The fluoropolymers of the described invention reduce water permeability because of the bonding between the fluoropolymer and the substrate. Other systems do not have all of these novel combination of features.

Figure 1:
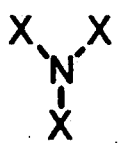
FIG. 1 is a representation of the structure of a silicone amine $C_8$ fluoroepoxy resin.
Figure 1:
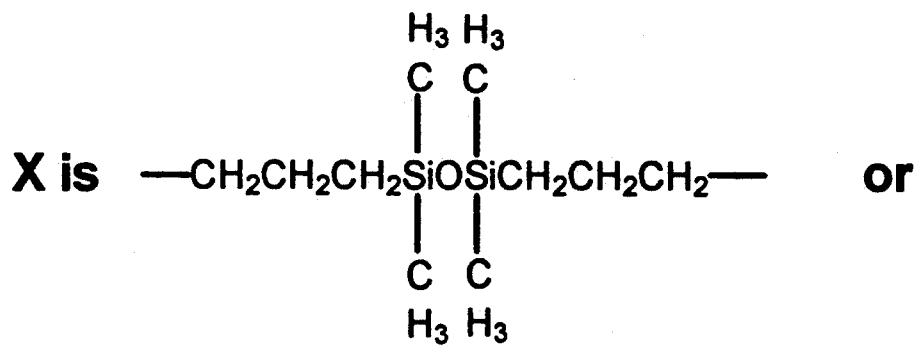
Figure 1:
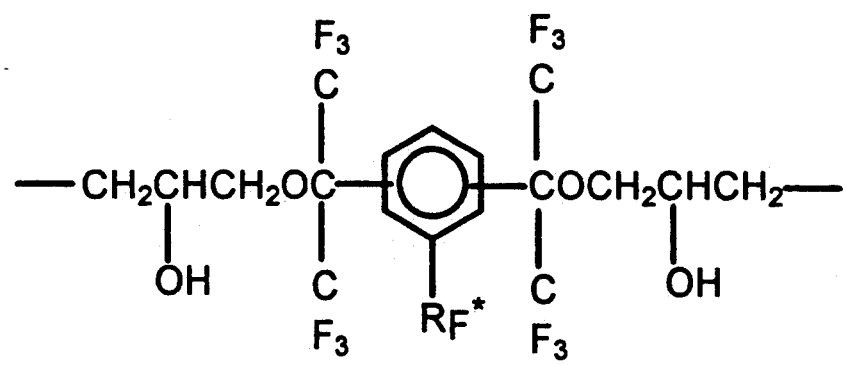
Figure 1:
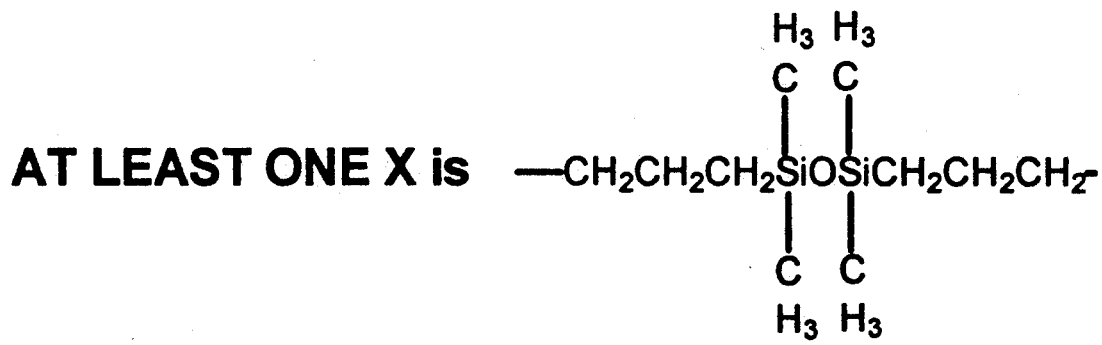

Two fluorinated polymers were prepared for testing as coatings or claddings for optical fibers. A heat cured silicone amine fluoroepoxy resin as shown in FIG. 1 was synthesized by mixing the $C_8$ diglycidyl ether of corresponding structure with (bis-$\gamma$-aminopropyl)tetramethyldisiloxane in a 7.56:100 weight ratio at approximately 50° C. until both reactants became mutually soluble (about 20 minutes). Preparation of diglycidyl ethers is taught in U.S. Pat No. 3,879,430, incorporated herein by reference. Films of the mixed resin were cast neat and cured at 25° C. overnight in a nitrogen atmosphere and postcured in air for 8 hours at 80° C.

Figure 2:
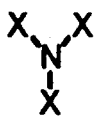
FIG. 2 is a representation of the structure of silicone amine $C_0$–$C_{16}$ fluoroepoxy resin.
Figure 2:
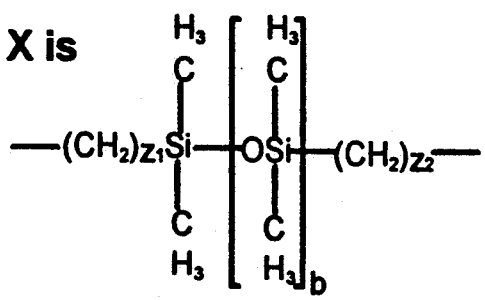
Figure 2:
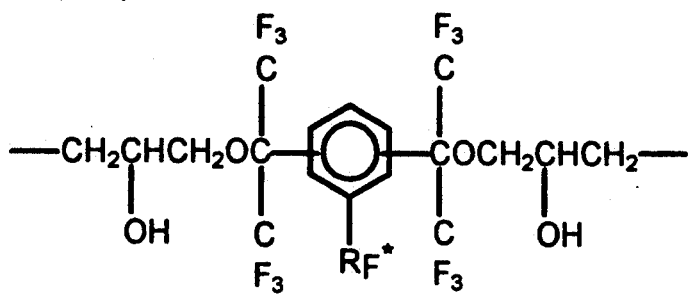
Figure 2:
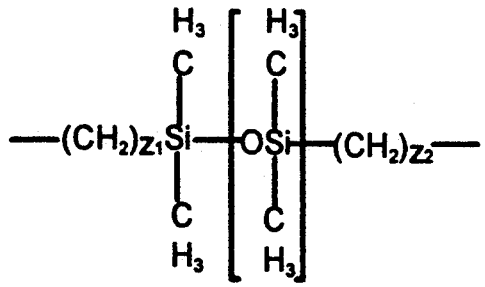
Figure 3:
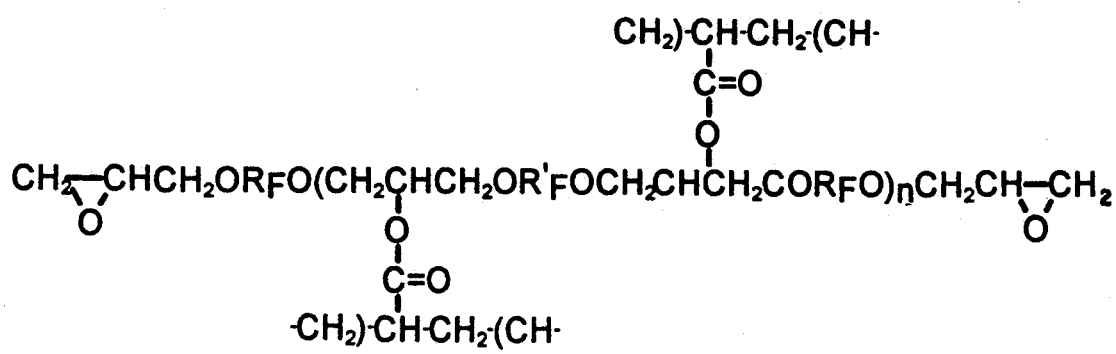
FIG. 3 is a representation of the structure of the cured cis-trans fluoropolyol polyacrylate.
Figure 3:
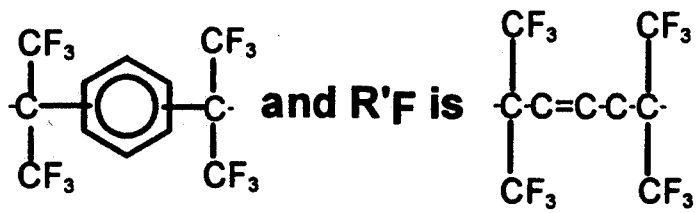

Other fluoroepoxy resins can be prepared using the same method as above and known starting materials. Approximately 0.1 mole of the appropriate diglycidyl ether is dissolved in 1 mole of (bis-$\gamma$-aminopropyl)tetramethyldisiloxane. Heat is applied to the reactants until they polymerize. The resulting resin can be cast in a desirable form or on a suitable substrate and cured. $C_0$ through $C_{16}$ fluoroepoxy resins can be prepared in this manner. $C_0$ is defined as when $R_F$ is hydrogen, and $C_1$ through $C_{16}$ is defined as when $R_F$ is $(CF_2)_n CF_3$ and n is 0 through 15, respectively, as shown in FIG. 2. Siloxane compounds useful for starting materials have been prepared such that b is equal to as high as 15, on the average.

Variations in chemical structure effect physical properties of the polymer and different compounds can be chosen for their desired physical properties. If moisture resistance is the primary concern, $C_8$ through $C_{16}$ fluoroepoxy resins are suitable. If abrasion resistance is the primary concern, $C_0$ through $C_7$ fluoroepoxy resins are appropriate.

A photo or heat curable fluoropolyol polyacrylate was cast neat into a film at 50° C. in a nitrogen atmosphere and exposed to ultraviolet radiation (3000 A, 1100 microW/cm$^2$). The structure and method of making fluoropolyol polyacrylate is disclosed in U.S. Pat. No. 4,284,747, incorporated herein by reference. The viscosity of the fluoropolyol polyacrylate must be adjusted to a practical range to permit in-line coating of fibers. The viscosity of the fluoropolyol polyacrylates can be adjusted by the use of vinyl, acrylate, diacrylate and methacrylate monomers.

Both materials incorporate fluorine into the polymer chain as fluoromethyl groups. The $C_8$ fluoroepoxy has an additional fluorinated hexane attached to the aromatic ring ($R_F^*$). The long chain adds flexibility and the aromatic ring gives strength and resiliency.

The invention having been generally described, the following test results and example are given as particular embodiments of the invention and to demonstrate the practice and advantages thereof. It is understood that the test results and example are given by way of illustration and are not intended to limit the specification or the claims to follow in any manner.

TEST RESULT I

A thin film of each polymer prepared as described above was placed over an aluminum cup containing 7 ml of distilled water. Moisture vapor permeability was determined using the cup method (Gardner-Park Permeability Cup—ASTM Standard D1653-72 moisture vapor permeability of organic coating films) maintained in an anhydrous environment at 22° C.+/−1°. After weighing the entire system, it was placed in a desiccator. Weighing every 24 hours determined how much water had permeated the polymer sample. Permeability coefficients were obtained from the steady-state flux when weight loss reach a constant value. Diffusion coefficients were also obtained from the weight loss data by observation of the time lag which occurred before any detectable weight loss could be measured.

Data in Table I were obtained from graphs showing weight loss versus time plots due to permeation of water through thin films of four types of polymers. The sample designated CT3 contained 100 times more free radical initiator than that utilized in the synthesis of CT0.03. Permeability and diffusion data obtained from these graphs are tabulated in Table II. Permeability coefficients are of the order of $10^{-12}$ g cm$^{-2}$ s$^{-1}$ cm/mm Hg and diffusion coefficients were of the order of $10^{-10}$ cm$^{-2}$ s$^{-3}$. Table III provides data on relative permeabilities of commercial coatings for optical fibers to those coatings of the present invention. All of the films of the present invention show subtantially better resistance to water migration than their commercial counterparts.

TABLE I

Data Obtained From Weight Loss Versus Time Graphs

| ID | Composition | Thickness (mils) | X-Intercept (h) | Time Lag (s) | Diffusion Coefficient ($\times 10^{-10}$ cm$^2$s$^{-1}$) | Steady State Flux ($\times 10^{-8}$ gcm$^{-2}$s$^{-1}$) |
|---|---|---|---|---|---|---|
| CT3-1 | Fluoropolyol polyacrylate 100% esterified 3% AIBN* | 1.4 | 1.0 | 3600 | 5.85 | 4.62 |
| CT3-2 | Fluoropolyol polyacrylate 100% esterified 3% AIBN* | 1.0 | 0.5 | 1800 | 5.97 | 5.70 |
| CT3-3 | Fluoropolyol polyacrylate 100% esterified 3% AIBN* | 1.1 | 0.7 | 2520 | 5.15 | 2.34 |
| CT0.03-1 | Fluoropolyol polyacrylate 100% esterified 0.03% AIBN* | 1.0 | 2.5 | 9000 | 1.20 | 3.32 |
| CT0.03-2 | Fluoropolyol polyacrylate 100% esterified 0.03% AIBN* | 1.0 | 6.0 | 21600 | 0.50 | 2.64 |
| CTO.03-3 | Fluoropolyol polyacrylate 100% esterified 0.03% AIBN* | 0.9 | 2.0 | 7200 | 1.21 | 7.18 |
| CT UV | Fluoropolyol polyacrylate 100% esterified 0.03% UV cure | 1.0 | 0.5 | 1800 | 5.97 | 15.5 |
| CT8-1 | Epoxy cured with bis(-amino-propyl) tetra-methyl-disiloxane | 1.0 | 3.0 | 10800 | 1.00 | 2.85 |
| CT8-2 | Epoxy cured with bis(-amino-propyl) tetra-methyl-disiloxane | 1.0 | 2.5 | 9000 | .19 | 3.38 |

*AIBN - Azoisobutyronitrile

TABLE II

Permeability and Diffusion Data

| Polymer and curing agent | ID | Permeability coefficient $\times 10^{12}$ gcm$^{-2}$s$^{-1}$cm/mmHg) | Diffusion coefficient $\times 10^{10}$ cm$^2$s$^{-1}$) | Solubility (g cm$^{-3}$) | Contact angle (approx.) |
|---|---|---|---|---|---|
| cis-trans fluoropolyol polyacrylate + 3% AIBN* | CT3-1 -2 -3 | 8.22 7.24 7.26 | 5.85 5.47 5.15 | 1.41 1.32 1.40 | 68.0 68.0 68.5 |
| cis-trans fluoropolyol polyacrylate + 0.03% AIBN** | CT0.03-1 -2 -3 | 4.22 3.35 8.22 | 1.20 0.50 1.21 | 3.52 6.70 6.79 | 68.5 68.5 68.0 |
| cis-trans fluoropolyol polyacrylate (UV cured) | CT-UV | 19.68*** | 5.97 | 3.3 | 65.0 |
| Fluoroepoxy cured with bis(-amino propyl) tetra-methyl disiloxane | C8-1 C8-1 | 3.62 4.29 | 1.00 1.19 | 3.62 3.61 | 66.0 66.0 |

*Indicates an excess amount of initiator used
**Indicates the usual amount of initiator used, more accurately reflects expected value
***Neglected in final computation of moisture vapor permeability. High values were most likely due to pinholes or other imperfections since earlier values on 3 mil thick films (less chance of imperfections) showed comparable values for both fluoroepoxy and UV light-cured fluoropolyol films.

TABLE III

Comparison of Moisture Permeabilities of Polymer Coatings for Optical Fibers

| Polymer | Moisture Permeability (metric perm cm) |
|---|---|
| DeSolite 950 × 030 UV-cured primary buffer | 0.029 |
| DeSolite 95- × 101 UV-cured secondary buffer | 0.036 |
| DeSolite 950 × 130 UV-cured single coat buffer | 0.076 |
| cis-trans Fluoropolyol polyacrylate UV-cured primary buffer | 0.0033 |
| Silicone amine fluoroepoxy heat-cured secondary coating | 0.0033 |

TEST RESULT II

Dynamic mechanical tests were performed on the fluoroepoxy and fluoropolyol polyacrylate films prepared as described above using a Rheo-Vibron DDV-II in order to determine the elastic modulus and glass transition temperature of the samples. Both fluoroepoxy and fluoropolyol polyacrylate polymers responded in a similar manner to changes in temperature under the applied oscillatory force of the Rheo-Vibron, probably due to similarities in chemical structure. At ambient temperature (22° C.) the elastic modulus of the fluoroepoxy polymer is $2 \times 10^{10}$ dyn/cm$^2$ while that of the fluoropolyol polyacrylate is $4 \times 10^{10}$ dyn/cm$^2$. At the glass transition temperatures of 55° C. for the fluoropolyol polyacrylate samples and 60° C. for the fluoroepoxy, the elastic modulus was about $10^8$ dyn/cm$^2$.

Due to the greater degree of homogeneity in the silicone amine fluoroepoxy, an abrupt change in modulus and a very sharp damping maximum was observed. The increase in motion of the polymer segments occurs in unison. Due to the more random structure of fluoropolyol polyacrylate, increased mobility occurs at different temperature of various segments of the polymer chain. These changes occur over a wide temperature range between 30 and 70° C.

The glass transition temperature $T_g$ of copolymers is analogous to that of plasticized materials if the comonomer (MMA) is considered to be a plasticizer for homopolymer fluoropolyol polyacrylate. It is postulated that the addition of MMA to cis-trans fluoropolyol polyacrylate may have resulted in a lowering of the glassy state modulus of fluoropolyol polyacrylate below $10^{10}$ dyn/cm$^2$ as required.

TEST RESULT III

The index of refraction of cis-trans fluoropolyol polyacrylate was determined using index matching oils to be 1.437. It would thus act as a cladding for a silica glass fiber core which has an index of refraction of 1.458. Although the resulting aperture of 0.21 is not as high as has been achieved with other polymer claddings, there are applications such as chemical sensors where such a fiber is acceptable.

EXAMPLE I

Figure 4:
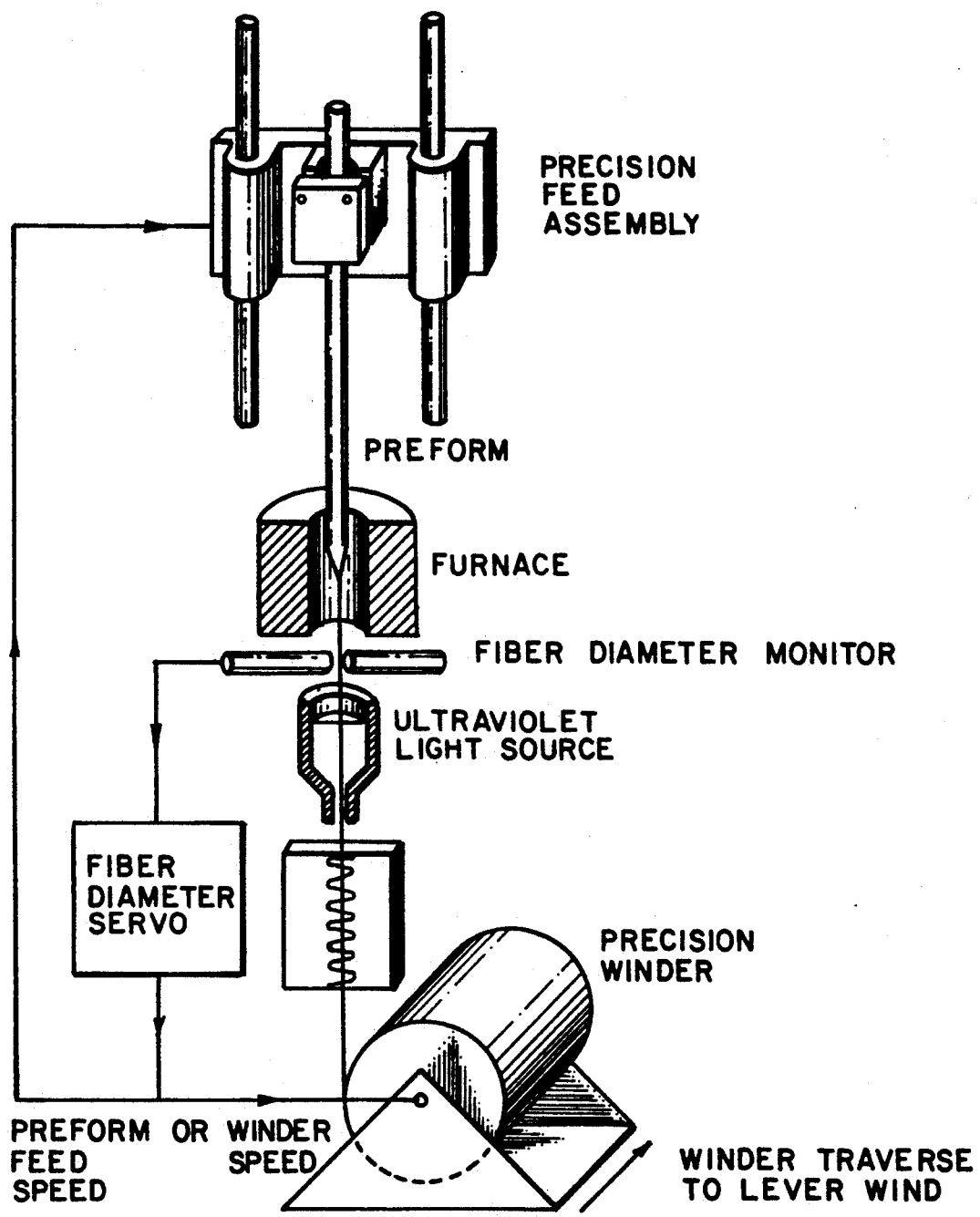
FIG. 4 is a schematic layout of an optical fiber draw tower.

A Suprasil glass preform was drawn and coated with cis-trans fluoropolyol polyacrylate. The resin was cured in-line using an intense xenon (UV) light source. The use of Irgacure 184 (1-hydroxycyclohexylphenyl ketone) or a benzophenone-type photoinitiator coupled with the xenon (uv) light source, designed to cure optical fiber coatings, allowed rapid curing of the copolymer in a ambient (oxygen) environment without the need for a nitrogen blanket. An optical fiber draw tower was employed similar to that depicted in FIG. 4. Standard process method and parameters were used to draw and coat the optical fiber. The cis-trans fluoropolyol polyacrylate acted as both a coating and a cladding since it was coated directly onto the glass core.

In order to coat the silica glass fiber in-line, it was necessary to reduce the viscosity of cis-trans fluoropolyol polyacrylate from its determined value of 20,000 cP to between 300 and 10,000 cP or, more preferably, 300 to 1000 cP. This was accomplished by the addition of a reactive diluent which decreased the viscosity of the solution while reacting with the cis-trans fluoropolyol polyacrylate to form a copolymer. Any vinyl or acrylate comonomer, such as methyl methacrylate (MMA), methyl acrylate, acrylonitrile or styrene would be able to function as a reactive diluent with cis-trans fluoropolyol polyacrylate. The choice would depend on the properties desired. For example, styrene would produce a relatively rigid material whereas MMA produces a relatively flexible material with good optical properties. A small amount of MMA (up to approximately 4% by weight) was found to reduce the viscosity of fluoropolyol polyacrylate to within a suitable range.

A scanning electron microscope magnified a cross section of the optical fiber coated in Test Results III 274 times the original size. The 125 micron diameter fiber was surrounded by a coating/cladding of cis-trans fluoropolyol polyacrylate of thickness varying between 60-80 micron.

The fluoropolymers of the present invention exhibit substantially increased barrier properties against the migration of moisture when compared to conventional fiber coating materials. In addition to improved barrier properties, incorporation of fluorine into the polymer structure lowers the index of refraction of the polymer enabling a material to be tailored for used as a cladding in conjunction with silica glass. Also, one fluoropolymer formulation allowed in-line coating of the optical fiber in a oxygen environment. The combined optical, mechanical, barrier and curing properties of the present invention make them candidates for the coating and/or cladding of fiber optic waveguides.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of the United Sates is:

1. A u.v. photocured fluoropolyol polyacrylate optical fiber coating which has been produced by in-line coating of an optical fiber with a mixture comprising a photocurable cis-trans fluoropolyol polyacrylate resin in admixture with a vinyl monomer, in an amount effective to reduce the viscosity of said photocurable fluoropolyol polyacrylate resin to between 300 and 10,000 cP prior to copolymerization therewith, and an amount of a benzophenone or 1-hydroxycyclohexylphenyl ketone photoinitiator effective to render said mixture u.v.-photocurable and curing said mixture with u.v. radiation in the presence of oxygen to provide an infinite network polymer comprising a copolymer of a cis-trans fluoropolyol polyacrylate containing the following structure:

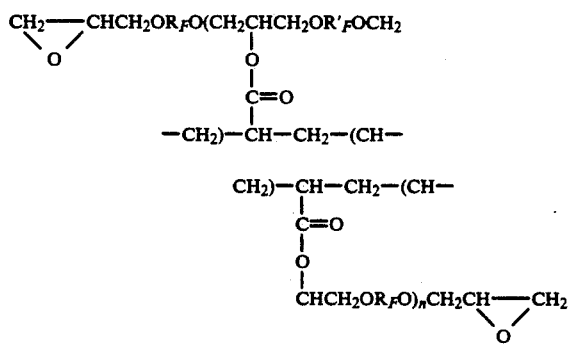

wherein n is an integer from 4 to 10 and $R_F$ is

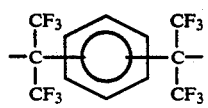

and $R'_F$ is

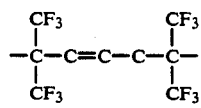

and said monomer.

2. The optical fiber coating of claim 1, wherein said photoinitiator is 1-hydroxycyclohexylphenyl ketone.

3. The u.v. photocured fluoropolyol polyacrylate optical fiber coating of claim 1, wherein said vinyl monomer is selected from the group consisting of an acrylate, a diacrylate and a methacrylate.

4. A method of preparing an optical fiber having a fluoropolyol polyacrylate coating thereon, comprising the steps of:
coating an optical fiber with a photocurable cis-trans fluoropolyol polyacrylate optical fiber coating resin in admixture with a vinyl monomer, in an amount effective to reduce the viscosity of said photocurable fluoropolyol polyacrylate resin to between 300 and 10,000 cP and an amount of a benzophenone or 1-hydroxycyclohexylphenyl ketone photoinitiator effective to render said mixture u.v.-photocurable;
curing said mixture with u.v. radiation in the presence of oxygen, thereby providing an infinite network polymer comprising a copolymer of a cis-trans fluoropolyol polyacrylate containing the following structure:

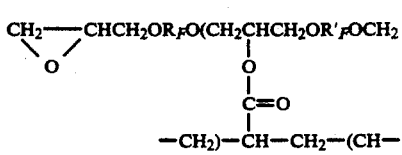

wherein n is an integer from 4 to 10 and $R_F$ is

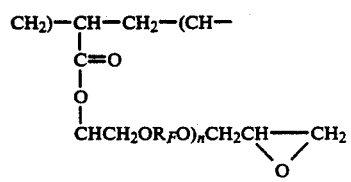

and $R'_F$ is

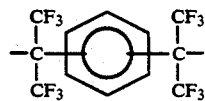

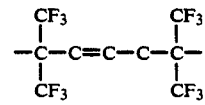

and said monomer.

5. The method of claim 4, wherein said photoinitiator is 1-hydroxycyclohexylphenyl ketone.

6. The method of claim 4, wherein said vinyl monomer is selected from the group consisting of an acrylate, a diacrylate and a methacrylate.

* * * * *